Patented Feb. 28, 1950

2,498,634

UNITED STATES PATENT OFFICE 2,498,634

NICOTINIC ACID ANHYDRIDE

Charles O. Badgett, Glenside, and Charles F. Woodward, Abington, Pa., assignors to the United States of America as represented by the Secretary of Agriculture No Drawing. Application September 10, 1946, Serial No. 696,025

4 Claims. (Cl. 260—295.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of nicotinic acid (pyridine beta-carboxylic acid) anhydride.

Nicotinic acid anhydride has been heretofore produced by reacting sodium nicotinate with nicotinyl chloride. However, nicotinyl chloride is not readily available, and its production, especially with the degree of purity required, is tedious and expensive.

The present invention has among its objects a process of producing nicotinic acid anhydride in a more economical manner than that before known.

In general, according to the invention, a composition is first prepared by heating for from about 1 to 4 hours nicotinyl chloride hydrochloride (the reaction production of thionyl chloride and nicotinic acid, preferably in substantially equimolecular amounts with an inert organic solvent which boils not below the heating temperature under the pressure conditions used. It is not necessary that the nicotinyl chloride hydrochloride be prepared first and then heated with the solvent. The thionyl chloride and nicotinic acid may be mixed with the solvent and then heated, thus simultaneously producing the nicotinyl chloride hydrochloride and heating it with the solvent.

The resulting composition is then mixed with a metal salt of nicotinic acid to form the nicotinic acid anhydride.

The heating temperature employed in producing the composition first prepared may be varied but should not be appreciably below 150° C. The preferable range is, however, about from 150° to 210° C. although higher temperatures may be used.

Nitrobenzene is a very satisfactory solvent for the purpose, although orthodichlorobenzene may be used. The essential requirements are that the proportions of solvent used may vary over wide limits.

Various metallic salts of nicotinic acid may be used to react with the composition thus obtained to produce the nicotinic acid anhydride. The alkali metal salts, the alkaline earth metal salts, the copper salt, and the zinc salt are among those which may be mentioned. From the standpoint of efficiency, availability and economy, potassium nicotinate is preferable.

The temperature for the part of the reaction involving reacting the metal salt of nicotinic acid with the composition first prepared may be varied over a wide range, the higher temperatures increasing the reaction velocity, although, of course, a temperature sufficiently high to decompose the formed nicotinic acid anhydride should be avoided. Temperatures as low as from 75° to 100° C. may be used, although it is expeditious to maintain the temperature corresponding to that used in producing the first prepared composition, since then the salt of nicotinic acid can be added directly and immediately thereafter to the composition, thereby to form the nicotinic acid anhydride.

The following examples exhibit the invention in more detail:

Example I

A mixture consisting of 61.5 gm. nicotinic acid and 178 gm. thionyl chloride was heated under reflux for 5 hours to produce nicotinyl chloride hydrochloride. The unreacted thionyl chloride was removed by distillation under reduced pressure and 150 cc. of nitrobenzene was added to the residue. The resulting nitrobenzene and nicotinyl chloride hydrochloride mixture was heated slowly and with agitation to the boiling temperature of the solvent and then refluxed for 4 hours at atmospheric pressure. The solid material gradually dissolved with evolution of gases and a homogeneous solution was obtained. No precipitate was found when this solution was cooled to room temperature.

80.5 gm. of dry potassium nicotinate was added to the solution, and the mixture was heated at approximately 200° C. from 1 to 1½ hours.

The contents of the flask was allowed to cool to room temperature, mixed with 2 l. of benzene, heated to boiling, filtered hot, and cooled. A white crystalline precipitate consisting of nicotinic acid anhydride separated from the cooled filtrate and was recovered by filtration. On evaporating the mother liquor to approximately one-third of its volume, an additional amount of anhydride was obtained. The total yield of nicotinic acid anhydride was 52 gm. of a product which, after one recrystallization from benzene, melted at 122° to 123° C., and gave the following analysis:

|  | C | H | N |
|---|---|---|---|
|  | Per cent | Per cent | Per cent |
| Calculated for: $C_{12}H_8O_3N_2$ | 63.16 | 3.53 | 12.28 |
| Found | 63.15 | 3.63 | 12.23 |

Example II

Similar results were obtained by following the above procedure, but using in preparing the first composition, instead of the nicotinic acid and thionyl chloride, the corresponding amount (0.5 mole) of nicotinyl chloride hydrochloride prepared by the method described by Spaeth and Spitzer (1926 Ber. 59, 1477: C. A. 20, 3294).

Example III 40.6 gm. of nicotinic acid, 39.3 gm. of thionyl chloride and 100 cc. of orthodichlorobenzene were placed in a 500 cc. three-neck round bottom flask fitted with stirrer and reflux condenser, and the mixture was heated to reflux temperature with agitation. A small amount of white crystalline material consisting of nicotinyl chloride hydrochloride sublimed to the upper part of the flask. This sublimate was removed from the wall of the flask and returned to the reaction mixture. Heating under reflux was continued for approximately one hour.

53.1 gm. of dry potassium nicotinate was then added and the mixture heated under reflux for an additional period of about 3 hours.

The contents of the flask was then combined with 1 l. of benzene containing 10 gm. of decolorizing charcoal, heated to boiling, filtered hot, and cooled. Nicotinic acid anhydride separated from the cooled filtrate as a white crystalline precipitate which was filtered off yielding 51.1 gm. of a product melting at 122.8° to 123.5° C. An additional 7.6 gm. of nicotinic acid anhydride was obtained on evaporating the mother liquor to a volume of approximately 150 cc.

Example IV 246. gm. of nicotinic acid and 238 gm. of thionyl chloride were added to 600 cc. of nitrobenzene and heated under reflux for approximately 2 hours, or until no further evolution of gases from the reaction mixture took place. 322 gm. of potassium nicotinate was then added and the contents of the flask heated under reflux for approximately 3 to 4 hours.

The reaction mixture was poured in 3 l. of benzene, heated to boiling temperature and filtered hot. From the filtrate, 325 gm. of crystalline nicotinic acid anhydride was isolated as described in Example I.

Other methods of recovery of the nicotinic acid anhydride than by benzene extraction as set forth in the examples may be employed. For example, the anhydride may be directly crystallized from the liquid portion of the reaction mixture, or it may be isolated therefrom by fractional distillation under reduced pressure.

Having thus described the invention what is claimed is:

1. A process comprising preparing a composition by heating under conditions of reflux nicotinyl chloride hydrochloride for from about 1 to 4 hours at a temperature about from 150° to 210° C. with nitrobenzene, and reacting the resulting composition with a metal salt of nicotinic acid to form nicotinic acid anhydride.

2. The process of claim 1, wherein the metal salt of nicotinic acid is an alkali metal nicotinate.

3. The process of claim 1, wherein the metal salt of nicotinic acid is potassium nicotinate.

4. A process comprising preparing a composition by heating under conditions of reflux nicotinyl chloride hydrochloride for about 1 to 4 hours at a temperature about from 150° to 210° C. with a solvent selected from a class consisting of nitrobenzene and orthodichlorobenzene, and reacting the resulting composition with a metal salt of nicotinic acid to form nicotinic acid anhydride.

CHARLES O. BADGETT.
CHARLES F. WOODWARD.

REFERENCES CITED

The following references are of record in the file of this patent:

Berichte, 1928, vol. 61B, page 2205.
Chem. Abstracts, vol. 20, page 3294.
Chem. Abstracts, vol. 23, page 837 (1923).
Chem. Abstracts, vol. 25, page 3000.